(12) United States Patent
Ainalem (10) Patent No.: US 10,126,846 B2
(45) Date of Patent: Nov. 13, 2018

(54) PORTABLE ELECTRONIC DEVICE INCLUDING TOUCH-SENSITIVE DISPLAY AND METHOD OF CONTROLLING SELECTION OF INFORMATION

(71) Applicant: BlackBerry Limited, Waterloo (CA)

(72) Inventor: Mikael Ainalem, Malmö (SE)

(73) Assignee: BlackBerry Limited, Waterloo (CA)

( * ) Notice: Subject to any disclaimer, the term of this patent is extended or adjusted under 35 U.S.C. 154(b) by 440 days.

(21) Appl. No.: 14/682,851

(22) Filed: Apr. 9, 2015

(65) Prior Publication Data
US 2016/0299588 A1   Oct. 13, 2016

(51) Int. Cl.
| | |
|---|---|
| G06F 3/041 | (2006.01) |
| G06F 3/0484 | (2013.01) |
| G06F 3/0488 | (2013.01) |
| G06F 17/21 | (2006.01) |
| G06F 17/24 | (2006.01) |
| G06F 3/0481 | (2013.01) |

(52) U.S. Cl.
CPC ............ *G06F 3/041* (2013.01); *G06F 3/0481* (2013.01); *G06F 3/0488* (2013.01); *G06F 3/04842* (2013.01); *G06F 17/211* (2013.01); *G06F 17/24* (2013.01); *G06F 2203/04803* (2013.01)

(58) Field of Classification Search
CPC .... G06F 3/041; G06F 3/0488; G06F 3/04842; G06F 3/0485
USPC ......................................... 715/770, 860, 863
See application file for complete search history.

(56) References Cited

U.S. PATENT DOCUMENTS 5,760,773 A * 6/1998 Berman ................ G06F 1/1626
  345/672
5,930,787 A * 7/1999 Minakuchi ........ G06F 17/30014
(Continued)

FOREIGN PATENT DOCUMENTS

| JP | 2004086621 A | 3/2004 |
|---|---|---|
| JP | 2013008201 A | 1/2013 |

OTHER PUBLICATIONS

Extended European Search Report for Application No. EP16163510.7 dated Aug. 29, 2016, 7 Pages.

*Primary Examiner* — Daeho D Song
(74) *Attorney, Agent, or Firm* — Borden Ladner Gervais LLP; Geoffrey deKleine (57) ABSTRACT

A method of controlling selection of information on a display is provided. The method includes displaying the information on the display and displaying a selection indicator associated with a selection including a part of the information, and detecting an input to adjust an amount of the information included in the selection. In response to detecting the input, he selection indicator is adjusted based on the input. A determination is made whether the amount of the information included in the selection exceeds a threshold limit. In response to determining that the amount of the information included in the selection exceeds the threshold limit, the selection is displayed as a split selection by displaying a beginning part of the selection and an end part of the selection without displaying a middle part of the selection between the beginning part and the end part, and displaying a split indicator. In response to determining that the amount of the information included in the selection is within the threshold limit, display of the information included in the selection is continued.

18 Claims, 5 Drawing Sheets

(56) References Cited

U.S. PATENT DOCUMENTS

| | | | | |
|---|---|---|---|---|
| 6,877,137 B1* | 4/2005 | Rivette | G06F 17/30876 | 707/E17.112 |
| 8,065,603 B2* | 11/2011 | Gossweiler | G06F 3/0483 | 715/227 |
| 8,201,109 B2* | 6/2012 | Van Os | G06F 3/0488 | 715/710 |
| 8,365,059 B2* | 1/2013 | Walsh | G06F 17/2795 | 715/200 |
| 8,531,410 B2* | 9/2013 | Roth | G06F 3/0488 | 345/156 |
| 8,560,971 B2* | 10/2013 | Duquene | G06F 17/30126 | 707/828 |
| 8,572,481 B2* | 10/2013 | Migos | G06F 3/0483 | 715/243 |
| 8,650,507 B2* | 2/2014 | Westerman | G06F 3/04883 | 715/863 |
| 8,656,296 B1* | 2/2014 | Ouyang | G06F 3/0488 | 715/256 |
| 8,661,339 B2* | 2/2014 | Weeldreyer | G06F 3/0488 | 715/252 |
| 8,787,981 B2* | 7/2014 | Nomura | G06F 3/04883 | 455/556.1 |
| 8,856,678 B1* | 10/2014 | Cho | G06F 3/0488 | 715/784 |
| 8,952,912 B1* | 2/2015 | Hock | G06F 3/0483 | 345/173 |
| 9,009,588 B2* | 4/2015 | Zalewski | G06F 1/1626 | 715/234 |
| 9,092,130 B2* | 7/2015 | Weeldreyer | G06F 3/0488 | |
| 9,116,612 B2* | 8/2015 | Rimas-Ribikauskas | G06F 3/04842 | |
| 9,134,892 B2* | 9/2015 | Hicks | G06F 3/0486 | |
| 9,152,307 B2* | 10/2015 | Coleman | G06F 3/04842 | |
| 9,152,315 B2* | 10/2015 | Jeon | G06F 15/0291 | |
| 9,223,475 B1* | 12/2015 | Kim | G06F 3/0483 | |
| 9,250,096 B2* | 2/2016 | Kwak | G01C 21/367 | |
| 9,292,161 B2* | 3/2016 | Carter | G06F 3/04883 | |
| 9,348,511 B2* | 5/2016 | Ording | G06F 3/04886 | |
| 9,430,132 B2* | 8/2016 | Imoto | G06F 3/04842 | |
| 9,449,406 B2* | 9/2016 | Picard | G06F 3/04847 | |
| 9,495,092 B2* | 11/2016 | Kim | G06F 3/0488 | |
| 9,524,386 B2* | 12/2016 | Lee | G06F 21/45 | |
| 9,524,537 B2* | 12/2016 | Takagi | G06T 3/40 | |
| 9,535,527 B2* | 1/2017 | Ainalem | G06F 3/0412 | |
| 9,535,601 B2* | 1/2017 | Pangasa | G06F 3/04883 | |
| 9,542,668 B2* | 1/2017 | Gilad | G06Q 10/107 | |
| 9,645,717 B2* | 5/2017 | Kadishay | G06F 3/04883 | |
| 9,647,964 B2* | 5/2017 | Choi | G06F 3/0485 | |
| 9,658,746 B2* | 5/2017 | Cohn | G06F 3/0482 | |
| 9,658,762 B2* | 5/2017 | Park | G06F 3/0488 | |
| 9,659,015 B2* | 5/2017 | Cho | G06F 17/30058 | |
| 2002/0083101 A1* | 6/2002 | Card | G06F 3/04815 | 715/207 |
| 2002/0095427 A1* | 7/2002 | Kaplan | G06F 17/30905 | |
| 2002/0113802 A1* | 8/2002 | Card | G06F 3/04815 | 345/619 |
| 2002/0113823 A1* | 8/2002 | Card | G06F 3/04815 | 715/776 |
| 2002/0118230 A1* | 8/2002 | Card | G06F 3/04815 | 715/776 |
| 2004/0174399 A1* | 9/2004 | Wu | G06F 3/04883 | 715/863 |
| 2005/0223057 A1* | 10/2005 | Buchheit | G06Q 10/107 | 709/203 |
| 2007/0006099 A1* | 1/2007 | Johnson | G06F 3/0485 | 715/828 |
| 2007/0168875 A1* | 7/2007 | Kowitz | G06F 3/0485 | 715/764 |
| 2009/0265670 A1* | 10/2009 | Kim | G06F 3/04883 | 715/863 |
| 2010/0088641 A1* | 4/2010 | Choi | G06F 3/0482 | 715/828 |
| 2010/0097338 A1* | 4/2010 | Miyashita | G06F 3/04883 | 345/173 |
| 2010/0123669 A1* | 5/2010 | Chae | G06F 3/0488 | 345/173 |
| 2011/0066970 A1* | 3/2011 | Burrier | G06Q 30/02 | 715/782 |
| 2011/0080956 A1* | 4/2011 | Zhou | H04N 19/61 | 375/240.24 |
| 2011/0239110 A1* | 9/2011 | Garrett | G06F 3/0488 | 715/256 |
| 2012/0030566 A1* | 2/2012 | Victor | G06F 3/0482 | 715/702 |
| 2012/0054657 A1* | 3/2012 | Nurmi | G06F 3/0481 | 715/769 |
| 2012/0192118 A1* | 7/2012 | Migos | G06F 1/1626 | 715/863 |
| 2012/0204127 A1* | 8/2012 | Bos | H05K 999/99 | 715/784 |
| 2012/0216114 A1* | 8/2012 | Privault | G06F 3/04883 | 715/702 |
| 2012/0306772 A1* | 12/2012 | Tan | G06F 3/0488 | 345/173 |
| 2013/0047115 A1* | 2/2013 | Migos | G06F 17/241 | 715/776 |
| 2013/0097481 A1* | 4/2013 | Kotler | G06F 17/241 | 715/230 |
| 2013/0332850 A1* | 12/2013 | Bovet | H04L 51/22 | 715/752 |
| 2014/0136989 A1* | 5/2014 | Choi | G06F 3/0485 | 715/752 |
| 2014/0173482 A1* | 6/2014 | Hicks | G06F 3/0483 | 715/769 |
| 2014/0173484 A1* | 6/2014 | Hicks | G06F 3/0486 | 715/769 |
| 2014/0173530 A1* | 6/2014 | Mesguich Havilio | G06F 3/04883 | 715/863 |
| 2014/0245128 A9* | 8/2014 | Brant | G06F 17/217 | 715/234 |
| 2014/0372934 A1* | 12/2014 | Pereira | G06F 3/04842 | 715/781 |
| 2015/0186348 A1* | 7/2015 | Hicks | G06F 17/241 | 715/230 |
| 2015/0186349 A1* | 7/2015 | Hicks | G06F 17/241 | 715/230 |
| 2015/0186350 A1* | 7/2015 | Hicks | G06F 17/241 | 715/230 |
| 2015/0186351 A1* | 7/2015 | Hicks | G06F 17/241 | 715/232 |
| 2015/0261431 A1* | 9/2015 | Ohtsuka | G06F 3/04886 | 345/173 |

* cited by examiner

PORTABLE ELECTRONIC DEVICE INCLUDING TOUCH-SENSITIVE DISPLAY AND METHOD OF CONTROLLING SELECTION OF INFORMATION

FIELD OF TECHNOLOGY

The present disclosure relates to portable electronic devices including touch-sensitive displays.

BACKGROUND

Portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones, wireless PDAs, and laptop computers with wireless 802.11 or Bluetooth® capabilities.

Portable electronic devices such as PDAs or smart telephones are generally intended for handheld use and ease of portability. Small devices are generally desirable for portability. A touch-sensitive display, also known as a touch-screen display, is particularly useful on handheld devices, which have limited space for user input and output. The information displayed on the touch-sensitive displays may be modified depending on the functions and operations being performed.

Improvements in electronic devices, including portable electronic devices with touch-sensitive displays are desirable.

BRIEF DESCRIPTION OF THE DRAWINGS

Embodiments of the present disclosure will now be described, by way of example only, with reference to the attached figures, in which.

DETAILED DESCRIPTION

The following describes a portable electronic device and a method of controlling selection of information on a touch-sensitive display of the portable electronic device. The method includes displaying the information on the display and displaying a selection indicator associated with a selection including a part of the information, and detecting an input to adjust an amount of the information included in the selection. In response to detecting the input, he selection indicator is adjusted based on the input. A determination is made whether the amount of the information included in the selection exceeds a threshold limit. In response to determining that the amount of the information included in the selection exceeds the threshold limit, the selection is displayed as a split selection by displaying a beginning part of the selection and an end part of the selection without displaying a middle part of the selection between the beginning part and the end part, and displaying a split indicator. In response to determining that the amount of the information included in the selection is within the threshold limit, display of the information included in the selection is continued.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device, such as a portable electronic device as described herein. Examples of electronic devices include mobile, or handheld, wireless communication devices such as cellular phones, cellular smart-phones, wireless organizers, personal digital assistants, wirelessly enabled notebook computers, tablet computers, mobile internet devices, electronic navigation devices, and so forth.

Figure 1:
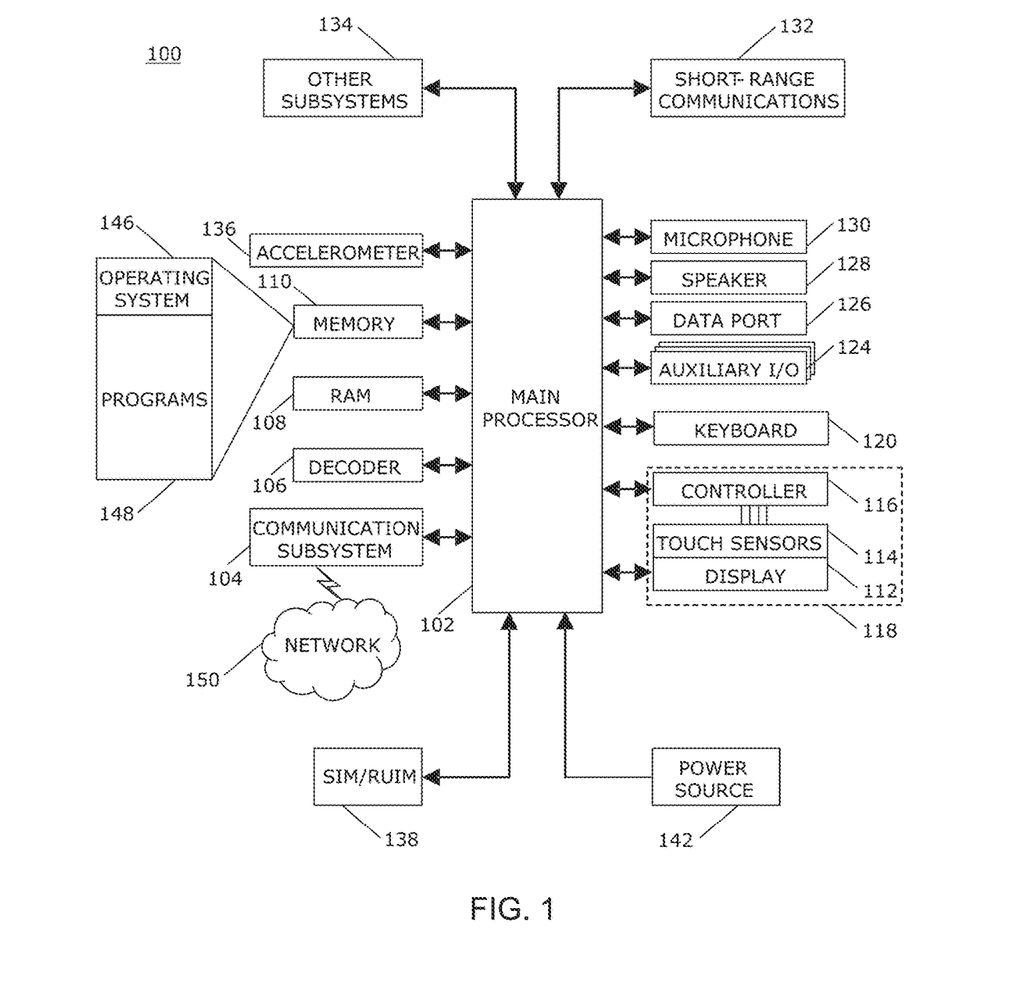
FIG. 1 is a block diagram of a portable electronic device in accordance with the present disclosure.

A block diagram of an example of an electronic device 100, which in the present example is a portable electronic device, is shown in FIG. 1. The electronic device 100 includes multiple components, such as a processor 102 that controls the overall operation of the electronic device 100. Communication functions, including data and voice communications, are performed through a communication subsystem 104. Data received by the electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the electronic device 100.

The processor 102 interacts with other components, such as a Random Access Memory (RAM) 108, memory 110, a touch-sensitive display 118, a keyboard 120, an auxiliary input/output (I/O) subsystem 124, a data port 126, a speaker 128, a microphone 130, short-range communications 132 and other device subsystems 134. The speaker 128, also referred to as an earpiece speaker, is utilized to output audible signals when a user's ear is very close to the speaker 128. Although not shown, the processor may also interact with a loudspeaker, for example, for handsfree use. The keyboard 120 includes a plurality of keys, which may be mechanical keys that include mechanical switches or contacts for input to the electronic device 100 when a mechanical key of the keyboard is depressed by a sufficient amount to oppose a bias of the mechanical key. Alternatively, or in addition, the keys of the keyboard may include touch sensors coupled to a controller to detect touch input thereon.

The touch-sensitive display 118 includes a display 112 and touch sensors 114 that are coupled to at least one controller 116 that is utilized to interact with the processor 102. Input via a graphical user interface is provided via the touch-sensitive display 118. Information, such as text, characters, symbols, images, icons, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

To identify a subscriber for network access, the electronic device 100 may utilize a Subscriber Identity Module or a Removable User Identity Module (SIM/RUIM) card 138 for communication with a network, such as the wireless network 150. Alternatively, user identification information may be programmed into memory 110.

The electronic device 100 includes an operating system 146 and software programs, applications, or components 148 that are executed by the processor 102 and are typically stored in a persistent, updatable store such as the memory 110. Additional applications or programs may be loaded onto the electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive touch-sensitive display that includes a plurality of capacitive touch sensors 114. Capacitive touch sensors 114 include drive electrodes, also known as transmission electrodes, and sense electrodes, also known as receive electrodes. The drive electrodes generally extend in one direction and cross over or under the sense electrodes, which generally extend in another direction, generally at right angles to the direction that the drive electrodes extend, to form a grid pattern. The drive electrodes are spaced from the sense electrodes by a dielectric material. The points at which the drive electrodes and the sense electrodes cross each other are referred to as nodes. The drive and sense electrodes may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A touch may be detected from any suitable input member, such as a finger, thumb, appendage, or other objects, for example, a stylus, pen, or other pointer, depending on the nature of the touch-sensitive display 118. Multiple simultaneous touches may be detected.

By repeatedly scanning the electrodes of the touch-sensitive display 118 to detect touches, movement of a touch relative to the touch-sensitive display 118 may be detected. One or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

The touch-sensitive display 118 includes a display area in which information may be displayed, and a non-display area extending around the periphery of the display area. Information is not displayed in the non-display area by the display. The non-display area is utilized to accommodate, for example, electronic traces or electrical connections, adhesives or other sealants, and/or protective coatings around the edges of the display area. The non-display area may be referred to as an inactive area and is not part of the physical housing or frame of the electronic device. Typically, no pixels of the display are in the non-display area, thus no image can be displayed by the display 112 in the non-display area. Optionally, a secondary display, not part of the primary display 112, may be disposed in the non-display area. Touch sensors including drive electrodes and sense electrodes may be disposed in the non-display area, which touch sensors may be extended from the touch sensors in the display area or may be distinct or separate touch sensors from the touch sensors in the display area. A touch, including a gesture, may be associated with, i.e., performed on, the display area, the non-display area, or both areas. The touch sensors including the drive electrodes and the sense electrodes may extend across substantially the entire non-display area or may be disposed in only part of the non-display area.

Figure 2:
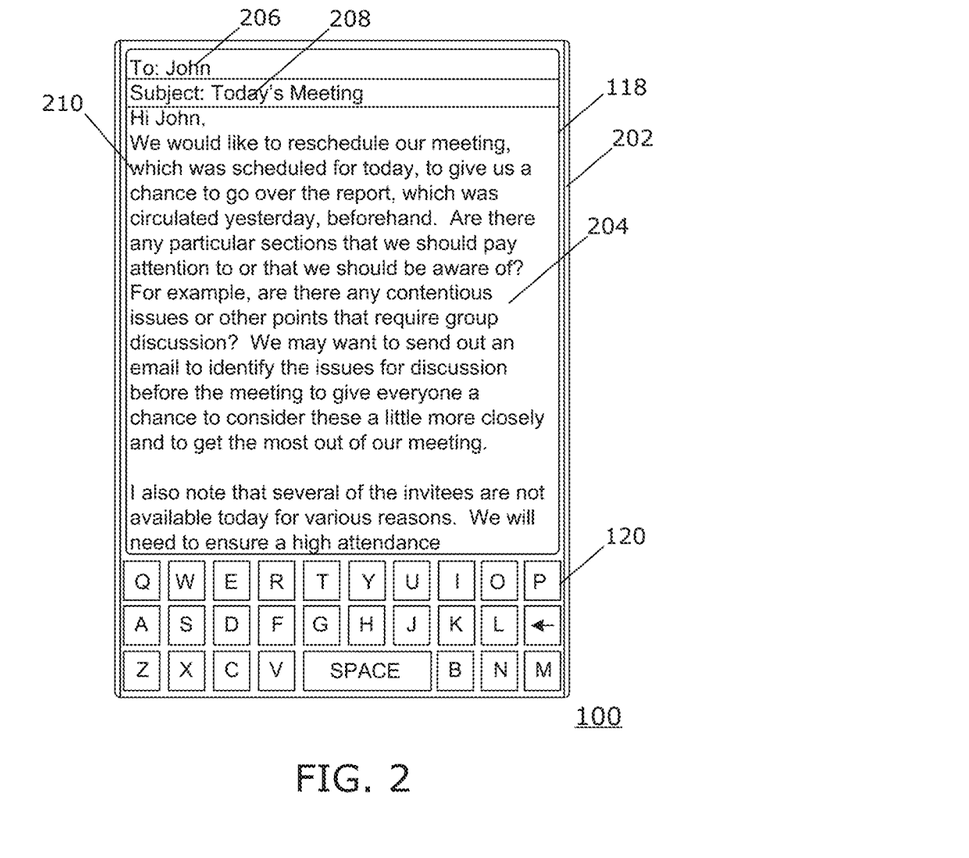
FIG. 2 is a front view of an example of a portable electronic device in accordance with the disclosure.

An example of an electronic device 100 is shown in FIG. 2. In the example of FIG. 2, the electronic device 100 includes a housing 202 in which the touch-sensitive display 118 is disposed. The housing 202 is utilized to enclose components such as the components shown in FIG. 1. The keyboard 120 is disposed below the touch-sensitive display 118 in the orientation illustrated in FIG. 2.

For the purpose of the example of FIG. 2, information 204 is displayed on the touch-sensitive display 118. The information 204 in this example is a message, such as an email message displayed on the touch-sensitive display 118. The information 204 that is displayed is text that includes words or strings in sentences that are arranged in paragraphs. Part of the information may not be displayed. For example, the information may too long, or may be displayed at a font or character size that is too large to be displayed at one time on the touch-sensitive display 118. Additional information may be displayable, for example, by scrolling upwardly or downwardly to change the part of the information that is displayed.

The email message may be a message received or a message composed utilizing the portable electronic device 100. The information includes fields such as a recipient or "To:" field 206, a "Subject" field 208 and a message content field 210.

The information is selectable, for example, by a touch on the touch-sensitive display 118 that meets or exceeds a threshold period of time or when two touches that overlap at least partially in time, are detected on the touch-sensitive display 118.

Figure 3:
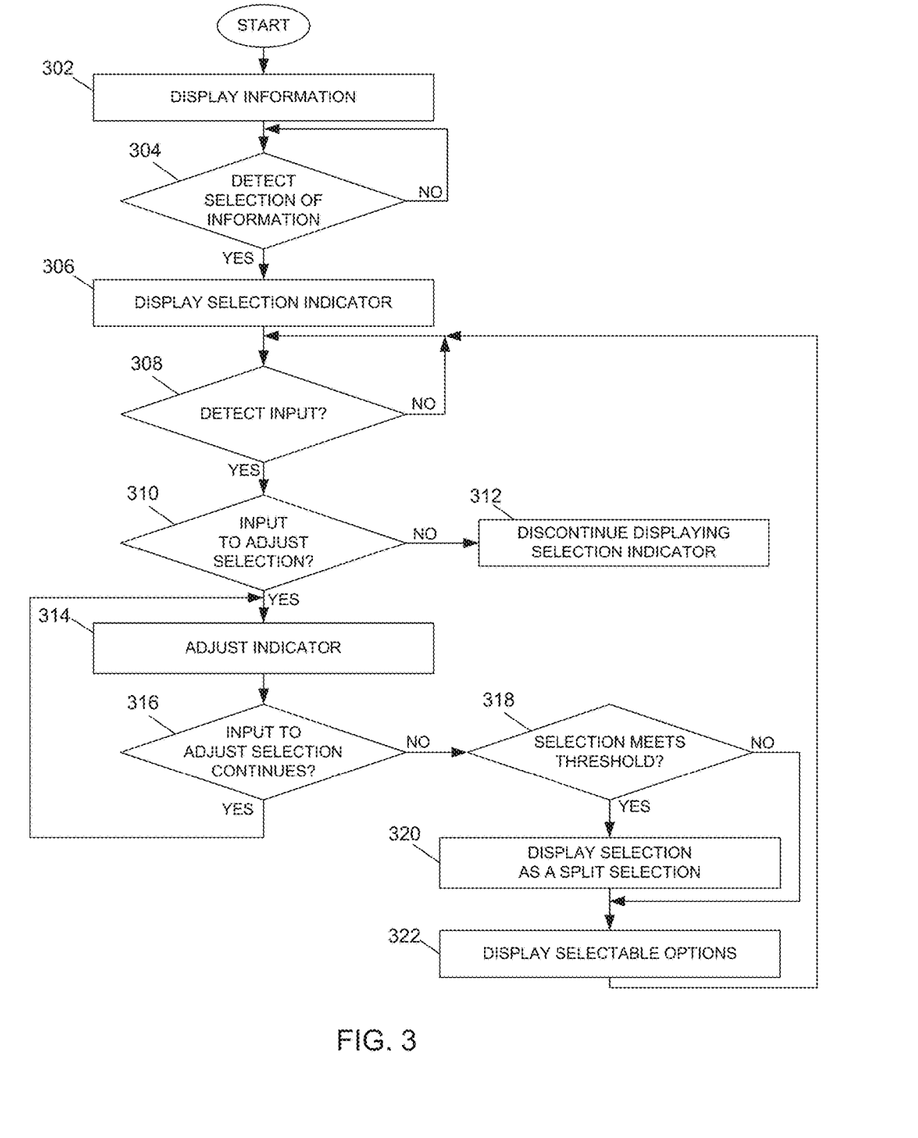
FIG. 3 is a flowchart illustrating a method of control of selection of information in accordance with the present disclosure.

A flowchart illustrating a method of controlling selection of information on a portable electronic device, such as the portable electronic device 100, is shown in FIG. 3. The method may be carried out by software executed, for example, by the processor 102. Coding of software for carrying out such a method is within the scope of a person of ordinary skill in the art given the present description. The method may contain additional or fewer processes than shown and/or described, and may be performed in a different order. Computer-readable code executable by at least one processor, such as the processor 102, of the portable electronic device to perform the method may be stored in a computer-readable storage medium, such as a non-transitory computer-readable medium.

Information is displayed 302 on the touch-sensitive display 118. The information may include text, characters, symbols, images, icons, and other items that may be displayed or rendered on a portable electronic device 118 in association with an application executed by the processor 102, such as, for example, an electronic mail, calendar, address book, word processor, Web browser, or any other suitable application.

In response to detecting an input to select part of the information at 304, the process continues at 306. In the example of the portable electronic device 100, the input may be a touch on the touch-sensitive display 118 that meets a touch criterion or criteria. The touch criteria may include a determination of whether or not the touch location is within the area in which the information is displayed and may include a comparison of contact time of the touch to a threshold period of time such that the touch meets the criteria when the touch contact meets the threshold period of time.

An indicator is displayed in the information that is displayed on the display 112 at 306. The indicator may include highlighting the part of the information that is selected. In addition to highlighting other identifiers may be displayed, such as a first identifier at the start of the selected information and a second identifier at the end of the selected information. In the example in which the input to select part of the information is a touch on the touch-sensitive display 118, the indicator is displayed at a location in the information at or near the location at which the touch is detected. The indicator may include highlighting the part of the information that is displayed. For example, a string, such as a word or words, closest to the location of the touch on the touch-sensitive display 118 may be highlighted.

In response to detecting an input at 308, the method continues at 310 and a determination is made whether the input is an input associated with the selection indicator. When the input is not an input that is associated with the selection indicator, display of the selection indicator is discontinued at 312. For example, a touch on the touch-sensitive display 118 is not associated with the selection indicator when the touch is not on or near the selection indicator. For example, when a touch is detected at a location on the touch-sensitive display 118, that is outside the area at which the selection indicator is displayed, display of the selection indicator is discontinued. Alternatively, when an input is received from a key of the keyboard 120, for example, when a key is depressed, display of the selection indicator may be discontinued. In this example, the part of the information that is selected and highlighted prior to receipt of the input form the key of the keyboard 120 may be replaced with the information entered utilizing the key of the keyboard 120.

In response to determining that the input is an input associated with the selection indicator to adjust the selection at 310, the method continues at 314. The input may be a gesture that begins on or near an area of the touch-sensitive display 118 at which the selection indicator is displayed, to adjust the amount of information included in the selection. For example, in response to receipt of a gesture that begins at a location on the touch-sensitive display 118, at or near the location at which the selection indicator is displayed, the portable electronic device 100 determines that the gesture is associated with the selection indicator and the method continues at 314. The gesture may be associated with one of the identifiers based on the location at which the gesture begins. For example, a gesture that begins at a location within a threshold distance of the selection indicator, may be associated with a nearest one of a first identifier at the start of the selected information and a second identifier at the end of the selected information to adjust the location of the identifier by dragging the identifier to adjust the amount of information included in the selection.

The indicator is adjusted at 314 based on the input associated with the selection indicator. For example, the indicator is adjusted based on the location of the gesture on the touch-sensitive display as the gesture progresses. Thus, in response to receipt of a gesture to adjust the amount of information included in the selection, the indicator is adjusted to highlight the adjusted selection. In the event that the amount of the selected information exceeds the size of the area in which the information is displayed, the information is scrolled such that a beginning part or an end part of the selection is scrolled off the display 112.

In response to determining that the input to adjust the selection continues at 316, the method continues at 314. Thus, as the input to adjust the selection continues the method continues at 314. As the location of the gesture on the touch-sensitive display changes, i.e., the touch moves to a new location at 316, the method continues at 314. As the touch continues, the indicator is continually adjusted to identify the adjusted selection.

In response to determining that the input to adjust the selection has ended at 316, a determination is made whether or not the amount of the information included in the selection meets a threshold limit at 318. Thus, the determination whether or not the amount of the information included in the selection meets the threshold limit is made based on the end location of the gesture on the touch-sensitive display 118. The amount of the information included in the selection is therefore compared to the threshold limit and in response to determining that the amount, or size of the information included in the selection exceeds the threshold limit, the method continues at 320. The threshold limit may be a predetermined or preset limit.

The threshold limit may be a size of a predetermined area of the display 112. For example, the threshold limit may be the size of the display area of the touch-sensitive display 118. Thus, in response to determining that the selection is too long and therefore no longer fits in the display area of the touch-sensitive display 118, such that all of the information included in the selection is not displayable on the touch-sensitive display 118 at one time, the method continues at 320.

Alternatively, the threshold limit may be a part of the display area of the touch-sensitive display 118 such that the threshold limit is less than the entire display area of the touch-sensitive display 118. For example, the threshold limit may be a fraction of the display area of the touch-sensitive display 118. In addition, information, such as a banner line or other information, may be displayed on the touch-sensitive display, before and after scrolling such that the information persists and is not moved on the touch-sensitive display 118 regardless of the amount of scrolling. The threshold limit may be based on the display area of the touch-sensitive display 118, not including the banner line or other information. Thus, the threshold limit may be equal to the display area after subtracting the area for the information that persists on the touch-sensitive display 118 or may be equal to a fraction or percentage of the display area after subtracting the area for the information that persists on the touch-sensitive display 118.

The selection is displayed as a split selection at 320. The selection is displayed as a split selection by displaying a beginning part of the information that is selected and displaying an end part of the information that is selected without displaying a middle part of the information. A split indicator is included to indicate that the middle part of the information is not displayed. The split indicator may be a break in the selected information that is utilized to notify the user that not all of the selected information is displayed.

The beginning part of the information may include a set number of lines or elements. For example, the beginning part may include the first three lines of the selection or any other suitable number of lines. Similarly, the end part of the information may include a set number of lines or elements. For example, the end part may include the final three lines of the selection or any other suitable number of lines. The split indicator is displayed between the beginning part and the end part of the information. Thus, in addition to the selected information, additional information, such as information before the selected information and information after the selected information, that is not included in the selection may be displayed.

In response to determining that the amount of the information included in the selection does not meet the threshold limit, i.e., is less than the threshold limit at 318, the method continues at 322. Thus, the selection is not displayed as a split selection as described above with reference to 320.

For a selection that is displayed as a split selection, the selection indicator is displayed to identify the beginning part of the information and the end part of the information. For a selection that is not displayed as a split selection, the selection indicator is displayed to identify all of the information included in the selection.

Selectable options are displayed on the touch-sensitive display 118 at 322. The selectable options are functions that may include, for example, an option to copy the selected information. The selectable options may also include, for example, options to cut the selected information, or to paste over the selected information, or both cut and paste. The selectable options may be dependent on the information, also referred to as context-sensitive. For example the cut and paste options may not be available when information is selected from a received message. The cut and paste options may be available, however, when information is selected in a composed message that is not yet sent.

The method continues at 308 such that the selection of information may be controlled by another input associated with the selection indicator to adjust the selection at 310.

Figure 4:
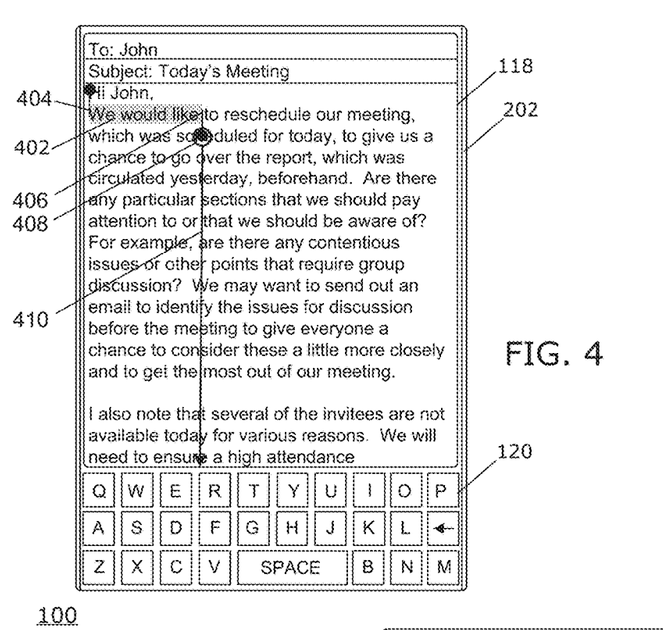
FIG. 4 through FIG. 7 illustrate examples of control of selection of information in accordance with the flowchart of FIG. 3.

Reference is made to FIG. 2 and FIG. 4 through FIG. 7 with continued reference to FIG. 3 to describe an example of the control of selection of information. For the purpose of the example shown in FIG. 2, and FIG. 4 through FIG. 7, the information 204 is displayed at 302, as illustrated in FIG. 2 and described above. A touch is detected on the portable electronic device 100 and the touch is maintained for a period of time that at least meets a threshold period of time at 304. A selection 402, including part of the information 204 is selected and a selection indicator is displayed at 306, as illustrated in FIG. 4 by the highlighted part of information and the first identifier 404 at the beginning of the selection and the second identifier 406 at the end of the selection.

Thus, in the present example, the selection indicator that is displayed in the information 204 includes highlighting around the selected block of text in the information and the identifiers 404, 406. In the present example, the identifiers 404, 406, also referred to as handles, include a line with a circle at one end, similar to a lollipop shape. The first indicator 404 includes the circle at the top of the line, generally above the selection 402 and the second indicator 406 includes a line with a circle at the bottom of the line, generally below the selection 402. The lollipop shaped identifiers are utilized to facilitate dragging the identifiers to adjust the selection. The terms above and below, up, down, right, and left are generally utilized herein to refer to the orientation in which the information is displayed and are not otherwise limiting.

Figure 5:
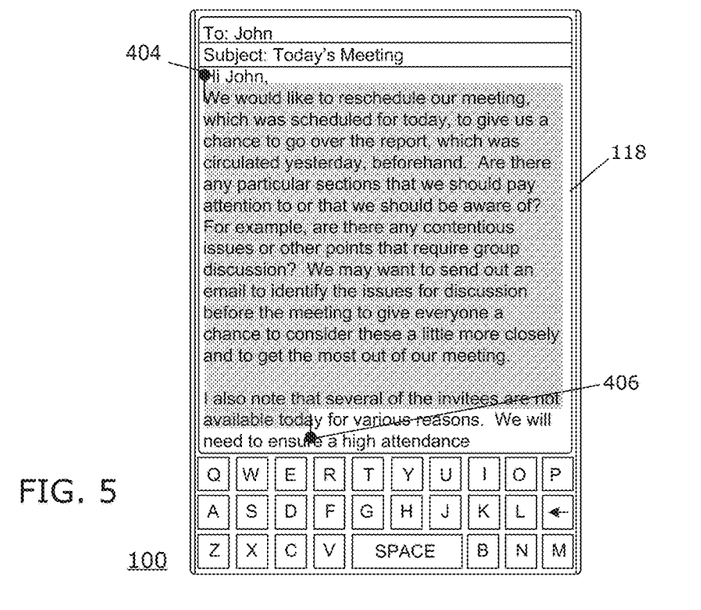

Input is detected at 308 and the input is a gesture beginning at or near the second indicator 406. The location at which the gesture begins is represented by the circle 408 on the touch-sensitive display 118 and the path of the gesture is illustrated by the arrow 410. The gesture is associated with the selection indicator to adjust the selection, as determined at 310. In response to detecting the gesture at 310, the indicator is adjusted at 314 to highlight the adjusted selection and display of the first identifier 404 and display of the second identifier 406 continues, as illustrated in FIG. 5. The second identifier 406, however, is moved along with the gesture as the gesture progresses, and the selection is adjusted.

Figure 6:
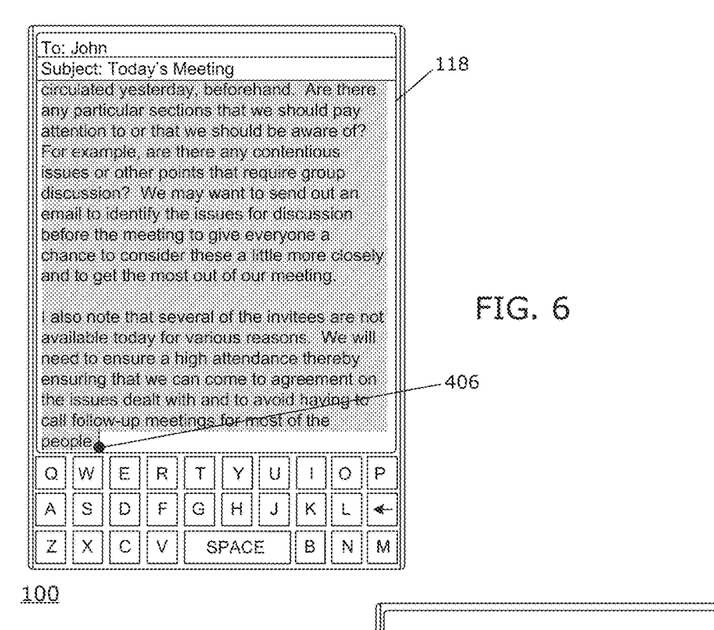

The gesture continues, as determined at 316, and the method returns to 314. As the gesture continues, the indicator is continually adjusted at 314. Thus, the second identifier is dragged along the information and the selection is adjusted based on the location of the touch as the identifier is dragged. The gesture continues to an edge of the touch-sensitive display 118 and the information is scrolled such that additional information is displayed and the selection is continually adjusted based on the touch location relative to the information. The amount of information in the selection, or the size of the selection, exceeds a threshold limit and part of the selection is scrolled off the touch-sensitive display 118, as illustrated in FIG. 6.

Figure 7:
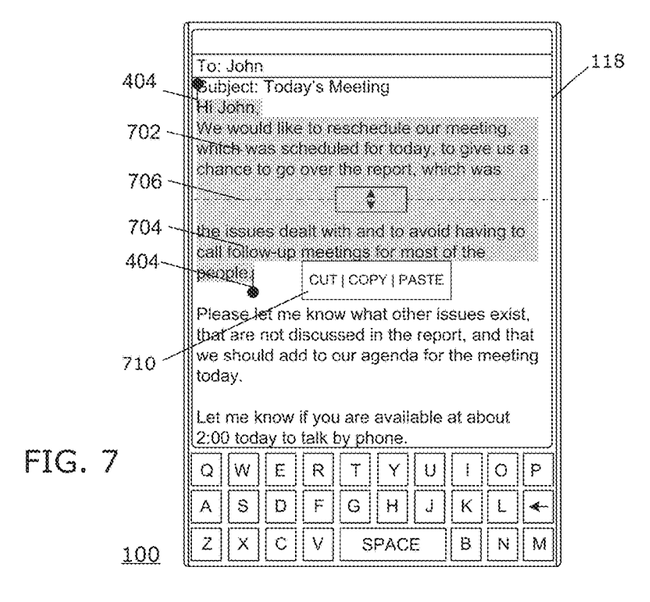

The input to adjust the selection ends at 316 and a determination is made whether or not the amount of the information included in the selection meets a threshold limit at 318. The amount of the information included in the selection is compared to the size of the display area of the touch-sensitive display 118 in which the message content field 210 is displayed. The amount of information included in the selection exceeds the threshold limit at 318 and the method therefore continues at 320. The selection is displayed as a split selection at 320. As illustrated in FIG. 7, the selection is displayed as a split selection by displaying a beginning part 702 of the information that is selected and displaying an end part 704 of the information that is selected without displaying a middle part of the information. As illustrated, both the first identifier 404 and the second identifier 406 are displayed while the selection is displayed as a split selection. Information that is not included in the selection and precedes the beginning part 702 of the selection is displayed and information that is not included in the selection and is after the end part 704 of the selection is displayed.

A split indicator 706 is included to indicate that the middle part of the information is not displayed. For the purpose of the present description, the beginning part 702 includes the first four lines of the selection of text of the email and the end part 704 includes the final three lines of the selection of text of the email. The number of lines of information in the beginning part 702 and the number of lines in the end part 704 may be preset or may be user-adjustable utilizing an option in a settings menu, for example. The split indicator 706 in this example is a dashed line and a box with a vertical double-ended arrow to indicate that the middle part of the selection is not displayed. Thus, the middle part of the selection is replaced with the split indicator 706.

Optionally, the split indicator may be adjustable to display less information in one of the beginning part 702 and the end part 704 or to show more information in one of the beginning part 702 and the end part 704. For example, the split indicator may be selectable by a touching the indicator box and dragging the indicator down to display more information in the beginning part 702 or moving the indicator up to display more information in the end part 704.

Selectable options 710 are displayed on the touch-sensitive display 118 at 322, as illustrated in FIG. 7. For the purpose of the present example, the selectable options 710 include options to cut the selected information, copy the selected information, and paste the selected information. Any one of the selectable options 710 may be selected by, for example, a touch on the option.

A second gesture may be received to select more information. The split selection is maintained and additional information is added to the middle part of the selection, which is not displayed, as more information is selected. Thus, in this example, the end part of the information changes as additional information is added by dragging the second identifier 706 downwardly relative to the information displayed in the view illustrated in FIG. 7.

A further gesture that drags the second identifier 406 upwardly relative to the information displayed in the view illustrated in FIG. 7, reduces the amount of information that is selected. Thus, less information is included in the middle part of the selection, which is not displayed. In addition, the second identifier 406 may also be dragged left or right in the views illustrated to adjust the selection.

A further gesture associated with the first identifier 404 may also be utilized to drag the first identifier up, down, left, or right relative to the information displayed.

Optionally, a user may cause the portable electronic device 100 to discontinue displaying the selection as a split selection. For example, a tap, which is a touch of very short duration or a double tap on the box may discontinue display of the split selection such that the middle part of the selection is displayed and the selection is scrollable to view the entire selection. Thus, the beginning part of the selection and the end part of the selection are not displayed at the same time.

In the above-described examples, the middle part of the selection is generally located vertically in the middle in the orientation in which the information is displayed. Thus, beginning first part of the information is disposed above the end part of the information. Alternatively, the selection may be displayed as a split selection by splitting the information such that the beginning part of the information is displayed on the left and the end part of the information is displayed on the right, with a split indicator in between to show that the information that horizontally in the middle of the beginning part of the information and the end part of the information is not displayed. Such a split may be useful, for example, to display information such as a plurality of thumbnails of pictures or attachments arranged in columns.

Advantageously, a selection that is too large to be displayed in an area on the display is displayed as a split selection by displaying a beginning part of the information that is selected and displaying an end part of the information that is selected without displaying a middle part of the information that is selected. In addition, identifiers, including an identifier at the start of the selection and an identifier at the end of the selection are always displayed. Information that is not included in the selection and precedes the beginning part of the selection is displayed and information that is not included in the selection and is after the end part of the selection is displayed. Thus, a user is provided with a view showing the start of the selection and the end of the selection as well as information preceding and following the selection to provide context and to facilitate accurate selection of information.

The scope of the claims should not be limited by the preferred embodiments set forth in the examples, but should be given the broadest interpretation consistent with the description as a whole.

What is claimed is:

1. A method of controlling selection of information on a display, the method comprising:
   displaying the information on the display and displaying a selection indicator associated with a user-selection comprising a user-selected content within the information;
   detecting an input associated with the selection indicator to adjust an amount of the user-selected content included in the user-selection;
   in response to detecting the input, adjusting the selection indicator based on the input and determining whether the amount of the user-selected content included in the user-selection exceeds a threshold limit;
   in response to determining that the amount of the user-selected content included in the user-selection exceeds the threshold limit:
      displaying the user-selection as a split selection by displaying a beginning part of the user-selection within the information and an end part of the user-selection within the information without displaying a middle part of the user-selection between the beginning part and the end part of the user-selection, and displaying a split indicator between the beginning part and the end part of the user-selection such that the middle part of the user-selection within the information is replaced by the split indicator;
      wherein the split indicator is selectable and, in response to a select and drag operation on the split indicator between the beginning part of the user-selection and the end part of the user-selection, moving the split indicator within the user-selection and thus adjusting the amount of the user-selected content in one or both of the beginning part of the user-selection within the information that is displayed and the end part of the user-selection within the information that is displayed;
   in response to determining that the amount of the user-selected content included in the user-selection is within the threshold limit:
      continuing displaying the user-selected content included in the user-selection.

2. The method according to claim 1, wherein the threshold limit is equal to a predetermined area of the display in which the information is displayed such that the amount of the user-selected content included in the user-selection exceeds the threshold limit when the size of the user-selection exceeds the size of the predetermined area of the display.

3. The method according to claim 1, wherein the display is part of a touch-sensitive display and detecting the input to adjust the amount of the user-selected content included in the user-selection comprises detecting a gesture on the touch-sensitive display, wherein the gesture is associated with the selection.

4. The method according to claim 1, wherein displaying the indicator comprises displaying a first identifier at a start of the user-selection and displaying a second identifier at an end of the user-selection.

5. The method according to claim 4, wherein the display is part of a touch-sensitive display and detecting the input to adjust the amount of the user-selected content included in the user-selection comprises detecting a gesture beginning on one of the first identifier and the second identifier.

6. The method according to claim 4, wherein the first identifier and the second identifier are both displayed prior to displaying the user-selection as the split selection.

7. The method according to claim 6, wherein the first identifier and the second identifier are both displayed during displaying the user-selection as the split selection.

8. The method according to claim 1, comprising discontinuing displaying the selection indicator in response to receiving an input not associated with the user-selection.

9. The method according to claim 1, wherein the display is part of a touch-sensitive display and the selection indicator associated with the user-selection is displayed in response to a touch contact meeting a threshold period of time.

10. The method according to claim 1, comprising displaying selectable options in response to detecting an end of the input to adjust the amount of the user-selected content included in the user-selection.

11. A non-transitory computer-readable medium having computer-readable code stored thereon, the computer-readable code executable by at least one processor of a portable electronic device to cause the electronic device to:
 display information on a display of the portable electronic device and display a selection indicator associated with a user-selection comprising a user-selected content within the information;
 detect an input associated with the selection indicator to adjust an amount of the user selected content included in the user-selection;
 in response to detecting the input, adjust the selection indicator;
 determine whether the amount of the user-selected content included in the user-selection exceeds a threshold limit;
 in response to determining that the amount of the user-selected content included in the user-selection exceeds the threshold limit:
  display the user-selection as a split selection by displaying a beginning part of the user-selection within the information and an end part of the user-selection within the information without displaying a middle part of the user-selection between the beginning part and the end part of the user-selection, and display a split indicator between the beginning part and the end part of the user-selection such that the middle part of the user-selection within the information is replaced by the split indicator;
  wherein the split indicator is selectable and, in response to a select and drag operation on the split indicator between the beginning part of the user-selection and the end part of the user-selection, move the split indicator within the user-selection and thus adjusting the amount of the user-selected content in one or both of the beginning part of the user-selection within the information that is displayed and the end part of the user-selection within the information that is displayed;
 in response to determining that the amount of the user-selected content included in the selection is within the threshold limit:
continue displaying the user-selected content included in the selection.

12. A portable electronic device comprising:
 a touch-sensitive display; and
 a processor operably coupled to the touch-sensitive display to control the touch-sensitive display to:
  display information on the display and display a selection indicator associated with a user-selection comprising a user-selected content within the information;
  detect an input associated with the selection indicator to adjust an amount of the user-selected content included in the user-selection;
  in response to detecting the input, adjust the selection indicator;
  determine whether the amount of the user-selected content included in the user-selection exceeds a threshold limit;
  in response to determining that the amount of the user-selected content included in the user-selection exceeds the threshold limit:
   display the user-selection as a split selection by displaying a beginning part of the user-selection within the information and an end part of the user-selection within the information without displaying a middle part of the user-selection between the beginning part and the end part of the user-selection, and display a split indicator between the beginning part and the end part of the user-selection such that the middle part of the user-selection within the information is replaced by the split indicator;
   wherein the split indicator is selectable and, in response to a select and drag operation on the split indicator between the beginning part of the user-selection and the end part of the user-selection, move the split indicator within the user-selection and thus adjusting the amount of the user-selected content in one or both of the beginning part of the user-selection within the information that is displayed and the end part of the user-selection within the information that is displayed;
  in response to determining that the amount of the user-selected content included in the user-selection is within the threshold limit:
   continue displaying the user-selected content included in the user-selection.

13. The portable electronic device according to claim 12, wherein the threshold limit is equal to a predetermined area of the display in which the information is displayed such that the amount of the user-selected content included in the user-selection exceeds the threshold limit when the size of the user-selection exceeds the size of the predetermined area of the display.

14. The portable electronic device according to claim 12, wherein the input to adjust the amount of the user selected content included in the user-selection comprises a gesture on the touch-sensitive display, wherein the gesture is associated with the user-selection.

15. The portable electronic device according to claim 12, wherein the indicator comprises a first identifier at a start of the user-selection and a second identifier at an end of the user-selection.

16. The portable electronic device according to claim 15, wherein the input to adjust the amount of the user-selected content included in the user-selection comprises a gesture beginning on one of the first identifier and the second identifier.

17. The portable electronic device according to claim 15, wherein the first identifier and the second identifier are both displayed prior to displaying the user-selection as the split selection.

18. The portable electronic device according to claim 17, wherein the first identifier and the second identifier are both displayed during displaying the user-selection as the split selection.

* * * * *